(12) United States Patent
Thar

(10) Patent No.: US 12,416,575 B2
(45) Date of Patent: Sep. 16, 2025

(54) REFERENCE MEASUREMENT

(71) Applicant: PyroScience GmbH, Aachen (DE)

(72) Inventor: Roland Thar, Aachen (DE)

(73) Assignee: PyroScience GmbH, Aachen (DE)

( * ) Notice: Subject to any disclaimer, the term of this patent is extended or adjusted under 35 U.S.C. 154(b) by 230 days.

(21) Appl. No.: 18/240,370

(22) Filed: Aug. 31, 2023

(65) Prior Publication Data

US 2025/0076199 A1 Mar. 6, 2025

(30) Foreign Application Priority Data

Aug. 31, 2023 (DE) .................... 10 2022 122 092.3

(51) Int. Cl.
*G01N 21/64* (2006.01)
*G01N 21/27* (2006.01)

(52) U.S. Cl.
CPC ....... *G01N 21/6408* (2013.01); *G01N 21/274* (2013.01)

(58) Field of Classification Search
CPC .................... G01N 21/6408; G01N 21/274
See application file for complete search history.

(56) References Cited

U.S. PATENT DOCUMENTS

| | | | | |
|---|---|---|---|---|
| 5,107,445 A * | 4/1992 | Jensen | ............... | G01K 11/3213 374/161 |
| 5,548,124 A | 8/1996 | Takeshima et al. | | |
| 2003/0099574 A1 | 5/2003 | Bentsen et al. | | |
| 2006/0266549 A1 | 11/2006 | Lin et al. | | |
| 2009/0283699 A1 * | 11/2009 | Baltz | ................. | G01N 21/6408 250/252.1 |
| 2018/0195905 A1 | 7/2018 | Poole et al. | | |
| 2019/0309253 A1 | 10/2019 | Ott et al. | | |

OTHER PUBLICATIONS

Stanciu et al., "LiCAF crystal-based optical fiber thermometry", Sensors and Actuators A: Physical, vol. 99, Issue 3, (Jun. 5, 2002), pp. 277-283. Seiten 277-283, XP004361693 (Year: 2002).*

(Continued)

*Primary Examiner* — Chih-Cheng Kao
(74) *Attorney, Agent, or Firm* — Miller Canfield

(57) ABSTRACT

A method and apparatus for determining a decay time of a luminescence of a sample, comprising the following steps:
excitation of a light source by means of an excitation current from a current source;
irradiating the sample with a light of a wavelength suitable for exciting luminescence in the sample, periodically varying the irradiation intensity;
measuring a light emitted from the sample, generating a first electrical signal in response to the light emitted from the sample, and amplifying the first electrical signal;
detecting a first phase difference between the excitation current and the amplified first electrical signal;
generating a second electrical signal, wherein the second electrical signal is generated directly from the excitation current of the current source and is subsequently amplified;
detecting a second phase difference between the excitation current and the amplified second electrical signal; and
determination of the decay time of the sample's luminescence based on a phase difference between the excitation current and the sample's light emission.

10 Claims, 2 Drawing Sheets

(56) References Cited

OTHER PUBLICATIONS

Hardock et al., "Using Coupled Vias for Band-Pass Filters in Multilayered Printed-Circuit Boards", 2015 German Microwave Conference, IEEE, (Mar. 16-18, 2015), pp. 88-90. (Year: 2015).*
Stanciu M et al: "LiCAF crystal-based optical fiber thermometry", Sensors and Actuators A: Physical, Elsevier BV, NL, Bd. 99, Nr. 3, Jun. 5, 2002 (Jun. 5, 2002), Seiten 277-283, XP004361693.
Hardock Andreas et al: "Using coupled vias for band-pass filters in multilayered printed-circuit boards", 2015 German Microwave Conference, IMA: Imatech E.V.

* cited by examiner

REFERENCE MEASUREMENT

CROSS-REFERENCE TO RELATED APPLICATIONS

This application claims priority to German patent application no. 10 2022 122 092.3, filed on Aug. 31, 2022, the disclosure of which is incorporated herein by reference.

BACKGROUND OF THE INVENTION

The field of application of luminescence measurements is broad and ranges from material characterization in the laboratory to medical diagnostics and environmental analysis to numerous industrial processes. Of particular interest is the application range of optical oxygen sensors based on dyes whose luminescence is dependent on the oxygen partial pressure.

A simple form of luminescence measurement is based on exciting a sample with a flash of light and then analyzing the luminescence response. The photons excite a sample by transferring their energy (hn) in an absorption process. If the subsequent deactivation of the sample takes place while emitting light, it is called photoluminescence. The duration between excitation and deactivation of the sample is called the lifetime or, in the case of fluorophores, the fluorescence lifetime, and in the case of fluorophores it generally occurs quite rapidly (within a millionth of a second) because photoluminescence in fluorophores is a state transition that is "allowed" according to the rules of quantum mechanics. In most cases, the luminescence exhibits a shift towards the longer wavelength spectrum compared to the excitation light (Stokes' rule). One reason is that during excitation by the photons, higher vibrational states are initially reached, from which part of the energy is released to the environment in the form of vibrational relaxations or phonons. Upon subsequent transition to a lower-energy state, the sample emits a photon with correspondingly lower energy, i.e., light with a longer wavelength. However, it can also happen that a fluorophore emits as much energy as it has previously absorbed (resonance fluorescence).

The quantum yield, i.e. the ratio of emitted photons to absorbed photons, can be affected by non-radiative deactivation processes. The frequency of non-radiative processes increases in the presence of certain substances, so-called quenchers. This is interesting in the context of optical oxygen sensors because molecular oxygen ($O_2$) is a quencher. The Stern-Volmer equation can be used to describe the dependence of the quantum yield on the concentration of the respective quencher.

After excitation of a luminescent sample with a flash of light, the sample produces an exponentially decaying luminescence response. The decay time is quantitatively dependent on the quantum yield. A control unit determines the decay time from the exponential curve. Due to the very short lifetimes mentioned previously, especially for fluorophores, a very wide amplifier bandwidth is required to achieve a time resolution high enough to detect the decay time with sufficient precision.

In order to keep the amplifier bandwidth smaller and thus make the application more robust, the phase measurement technique was established. The light source used for excitation is periodically controlled, for example with a square-wave function or sinusoidally. The period duration must be of approximately the same order of magnitude as the lifetime of the luminescence to be analyzed. The luminescence response is now also periodically varied in its intensity. The response exhibits a phase shift $dF_1$ with respect to the excitation signal. The phase shift $dF$ of the sample is related to the decay time t and the excitation frequency f via the following relation: $dF=\arctan(2 p f t)$. From this follows for the decay time $t=\tan(dF)/(2 p f)$ or approximately $t=dF/(2 p f)$ if the phase shift is sufficiently small. The measured phase shift $dF_1$ contains other phase shifts in addition to the phase shift $dF$. Due to the generally very weak emitted light, a high gain is required. However, economically attractive solutions in particular add a non-negligible temperature-dependent offset, which is included in the measured phase shift $dF_1$ and represents the largest disturbance factor of the further phase shifts. The temperature dependence of the offset and production-related fluctuations of the amplifiers prevent a purely mathematical elimination from the measured phase shift $dF_1$.

Usually, in addition to the first light source used to excite the luminescence, another light source is used whose light is directed onto the photodetector, for example via optical fibers and/or optical filters, without exciting the sample. It is important that the light generated by the reference light source is sufficiently attenuated to avoid damage to the photodetector and to prevent saturation effects. Production- and temperature-related variations in the chromaticity coordinates and intensity of LEDs, especially in the low-cost sector, further degrade the measurement. In addition, the extra effort of developing and trimming the reference path is a hindrance if miniaturization of the measurement device is the goal.

SUMMARY OF THE INVENTION

The invention relates to a method for determining luminescence of a sample, wherein the sample is irradiated with a light of a wavelength suitable for exciting luminescence in the sample, and the light emitted from the sample is measured in a receiver, wherein the luminescence of the sample is determined from a phase difference between the excitation signal and the light emission of the sample. Further, the invention relates to an apparatus for determining a luminescence of a sample, comprising a sample, a mA current source, a light source comprising a semiconductor material having a first bandgap suitable for generating a light of a wavelength sufficient to excite luminescence in the sample, a transimpedance amplifier, a switch, a means for electrically generating a reference signal, an evaluation unit, and a control unit.

Such a method and apparatus are known, for example, from WO 2007/068021. In the method disclosed herein, a reference light is transmitted to a receiver to generate a reference signal to compensate for environmental influences. Care is taken to ensure that the optical path of the reference light is separated from the optical path of the fluorescent light entering and leaving the sample, for example by an optical filter.

The object of embodiments of the invention is to provide a method that overcomes the disadvantages of previously established technologies and increases measurement accuracy, as well as a device that is suitable for carrying out the method and can be designed to be particularly compact. It is also the task of the present invention to provide a method and an apparatus which avoid the disadvantages of the prior art described above. According to the invention, this task is solved by a method having the features of independent claim 1 and by an apparatus having the features of independent claim 5. Advantageous embodiments result from the dependent claims.

The proposed method for determining a decay time of a luminescence of a sample, includes the following steps:

Exciting a light source by means of an excitation current of a current source, wherein the magnitude of the excitation current of the current source is periodically changed with frequency f between a minimum magnitude and a maximum magnitude;

Irradiating the sample with a light of a wavelength suitable for exciting luminescence in the sample, wherein the irradiation intensity is varied periodically with frequency f over several periods;

Measuring a light emitted from the sample in a receiver, generating a first electrical signal as a function of the light emitted from the sample, and amplifying the first electrical signal, wherein the light emitted from the sample varies in intensity periodically with frequency f such that the first electrical signal varies as a function of frequency f;

Detecting a first phase difference $dF_1$ between the excitation current and the amplified first electrical signal;

Generating a second electrical signal with frequency f for determining the additional phase shift caused by the measurement and amplification, wherein the second electrical signal is generated directly from the excitation current of the current source without an interposition of a light source and is subsequently amplified, wherein the sample is not irradiated during this time;

Detecting a second phase difference $dF_2$ between the excitation current and the amplified second electrical signal; and Determining the decay time of the luminescence of the sample based on a phase difference dF between the excitation current and the light emission of the sample, wherein the phase difference dF is determined from the difference of the first and second phase differences of the amplified electrical signals: $dF=dF_1-dF_2$.

An important advantage of this method is the elimination of the second light source and the purely electrical realization of the reference path, instead of the optical reference path, which simplifies the calibration of the measuring device due to the lack of a reference light source and additionally allows the measuring device to be miniaturized. The generation of the second electrical signal from the excitation current of the current source can, for example, be capacitive or inductive. The periodic excitation signal can preferably be a rect signal, a sawtooth signal, a trapezoidal signal or a triangular signal and in particular a sinusoidal signal, wherein the resulting excitation current is varied between $I_{min}$ and $I_{max}$, wherein $I_{min}$ in particular does not become negative. Preferably, $I_{min}$ is dimensioned on the basis of a data sheet of an LED or a LASER diode such that the LED is operated in the linear range, i.e. above the limit to non-radiative recombination processes in the p-n transition range, or the LASER diode is driven such that the stimulated emission processes in the LASER diode do not stop or stop only briefly. If a LASER diode is used, the maximum amount $I_{max}$ must also be selected to be small enough to prevent destruction of the reflective end faces of the LASER.

It is particularly preferred if the second electrical signal is generated from the excitation current via inductive coupling, the second electrical signal being an nA current signal. This avoids saturation effects in the amplifier and prevents damage to the measuring circuit.

The inductive coupling can preferably be realized by a transformer with a suitable number of turns ratio or by two conductor track sections running parallel to each other at a well-defined small distance.

According to the invention, it is particularly preferred that the inductive coupling is realized by exploiting a parasitic inductance of a first via, in that the excitation current through the first via builds up a magnetic field around the first via, with a second via being arranged at a defined distance from the first via, so that the second electrical signal is induced in the second via as a current signal in accordance with Lenz's rule due to a change in the magnetic field of the first via. Thus, the miniaturization potential is further exploited and an influence on further circuit parts and conductive paths is reduced, since the magnetic field built up around the first via is oriented in such a way that it mainly interacts with other vias. This is particularly interesting in the context of luminescence measurement, since the amplitude of the first electrical signal and the second electrical signal are so small that all noise sources must be suppressed as much as possible. The distance is preferably 10 μm to 10 mm, in particular 100 μm to 5 mm.

The proposed apparatus for carrying out a method for determining a luminescence of a sample comprises a sample, a mA current source, a light source comprising a semiconductor material with a first bandgap suitable for generating a light of a wavelength sufficient to excite luminescence in the sample, a photodetector suitable for a measurement of a light emitted by the sample due to luminescence, a transimpedance amplifier, a switch, a means for electrically generating a reference signal, an evaluation unit and a control unit. In order to carry out the method steps, the control unit controls the mA current source via an input voltage in such a way that its output current varies between a maximum value $I_{max}$ and a minimum value $I_{min}$ periodically, in particular sinusoidally, with the frequency f. The output current of the mA current source can be controlled by the control unit. This can preferably be done via a digital-to-analog converter (DAC) of a microcontroller, which is applied to the gate or base of a transistor, in particular to the base of a bipolar junction transistor (BJT) or to the gate of a field-effect transistor (FET), and drives it periodically, preferably sinusoidally, around a suitable operating point. Preferably, the DAC drives the light source via a voltage-to-current converter consisting of an operational amplifier and BJT. Alternatively, it is conceivable to drive a gate of a MOSFET via pulse width modulation (PWM) in such a way that the resulting current is varied sinusoidally between $I_{min}$ and $I_{max}$. Further, it is possible to use a prefabricated voltage-controlled current source in the form of a dedicated integrated circuit (IC). The control unit is capable of driving the switch so that the mA current source is connected either to the light source or to the means for electrically generating the reference signal. In the first switch position, the mA current source triggers light flashes through the light source at the frequency f. The amount of current varies the intensity of the emitted light from the light source, or the number of emitted photons of a first energy ($hn_1$). The light source preferably emits light with a wavelength of 420 nm to 650 nm. When the photons strike the sample, they release their energy ($hn_1$) in the process and excite the sample energetically. Subsequently, upon deactivation, the sample emits photons of energy ($hn_2$), which may be less than or equal to the first energy ($hn_1$). In this process, the number of photons emitted by the sample is generally much less than, but proportional to, the number of photons emitted by the light source. The photodetector aimed at the sample detects the photons of energy (hn₂) and generates a photocurrent as a function of the number of photons collected. In the context of the proposed method, the photocurrent serves as the first electrical signal, where the amplitude of the signal depends on the number of photons emitted by the sample, and thus on the number of photons incident on the sample and the frequency of non-radiative deactivation processes, and the signal varies with frequency f. Due to the, in good approximation, negligible travel time of the photons and the short "response time" of the photodetector, the electrical signal (the photocurrent) before amplification exhibits mainly a phase shift due to luminescence with respect to the excitation current. The photocurrent is then amplified by the transimpedance amplifier and converted into a voltage. This amplified first electrical signal contains a further phase difference compared to the signal before amplification due to the offset of the transimpedance amplifier caused by production and temperature. The evaluation unit detects the total phase difference $dF_1$ between the excitation current and the amplified first signal and stores it in a first register. The evaluation unit and the control unit can be located, for example, in a common microcontroller. In order to determine the actual luminescence-related phase shift dF, the control unit, after storing the first phase shift $dF_1$, sets the switch to the second position in which the mA current source is connected to the means for electrically generating the reference signal. The fact that the means generates the reference signal electrically means here that the reference signal is generated either capacitively, inductively or resistively. It may be useful to turn off the mA current source during the switching process to avoid potentially dangerous voltage spikes. Care must be taken to ensure that the reference signal, which in the context of the method is the second electrical signal, is also a current signal whose amplitude must be of the order of the amplitude of the photocurrent. This can be done by simulation-based dimensioning of the means for electrical generation of the reference signal. The second electrical signal is fed to the input of the transimpedance amplifier and amplified. Subsequently, the evaluation unit detects the phase shift $dF_2$ between the amplified second electrical signal and the excitation current and stores it in a second register. The actual phase shift due to luminescence is then calculated from the difference of the stored phase shifts: $dF=dF_1-dF_2$. An advantage of this apparatus is that it has a high miniaturization potential and can therefore be designed to be particularly small. In addition, the apparatus is easier to put into operation since a complex tuning process of the reference path is not required. Strictly speaking, because the mA current source is a voltage-controlled current source, the phase shift between the driving voltage and the amplified electrical signals is detected. However, because the same current source is used to generate the first and second electrical signals, the phase shift of the voltage-controlled current source is also reliably eliminated by the method.

Preferably, the light source is an LED or a LASER diode. LEDs are characterized by their high availability and low unit costs. In devices where a particularly small deviation from the main wavelength is required, i.e. an ideally monochromatic light is required, the use of a LASER diode is preferred. Both LEDs and LASER diodes are available in small form factor as SMD devices and can thus contribute to miniaturization. For example, the LEDs or LASER diodes can be based on silicon or a III-V compound semiconductor material. Depending on the application, the main wavelength can be in the range between the near-infrared and the long-wave UV light, in particular between 420 nm and 650 nm. Preferably, the minimum amount $I_{min}$ of the excitation current is dimensioned with the aid of the data sheet of the LED or the LASER diode such that the LED is operated in the linear range, i.e., above the limit to non-radiative recombination processes in the p-n transition range, or the LASER diode is driven such that the stimulated emission processes in the LASER diode do not stop or stop only briefly. If a LASER diode is used, the maximum amount $I_{max}$ must also be selected to be small enough to prevent destruction of the reflective end faces of the LASER.

Advantageously, the means for electrically generating the reference signal comprises a transformer, wherein the primary side is connected to the mA current source in a switch position controllable by the control unit, and the secondary side is electrically connected to the input of the transimpedance amplifier, wherein a number of turns ratio of the transformer is selected such that an amplitude of the current flowing on the secondary side is not greater than 10 times an amplitude of a current generated by the photodetector. This means that the amplitude of the second electrical signal must not become arbitrarily large. Otherwise, there is a risk of damage to the transimpedance amplifier or the evaluation unit. In addition, the current flowing on the secondary side must not become arbitrarily small so that it can still be reliably measured by the evaluation unit after amplification. For this purpose, the amplitude of the second electrical signal must not be less than, for example, 75% of the amplitude of the first electrical signal.

Alternatively, it is particularly preferred if the means for electrical generation has two vias arranged at a defined distance apart, the first via being connected to the mA current source in a switch position that can be controlled by the control unit, and the second via being electrically connected to the input of the transimpedance amplifier, the length of the vias and the distance between the vias being selected such that an amplitude of the current flowing in the second via is not greater than 10 times an amplitude of a current generated by the photodetector. Here, the current flowing in the second via must also not become arbitrarily small so that it can still be reliably detected by the evaluation unit after amplification. For this purpose, the amplitude of the second electrical signal is not less than, for example, 75% of the amplitude of the first electrical signal. The inductance of a via is generally a parasitic property through which unwanted noise is coupled into many printed circuit boards. To exploit the effect, the signal transmission between two vias is analyzed as follows: For example, in a two-layer Printed Circuit Board (PCB), the via extends from the top to the bottom. The via is a cavity in the PCB whose surface is covered with copper. With bottom and top planes in place, a transverse magnetic mode is formed between the vias, starting from the first via. With the boundary conditions that no fields exist in electrical conductors and that the field lines meet the conductors horizontally, the z-component of the E-field belonging to the TM mode is $E^z_{ln}(r,j,z)=-jB_{ln}k^2_{rl}/(wme)H^{(2)}_n(k_{rl}r)cos(nj)cos(lp/hz)$, with wavenumber $k_{rl}=sqrt(w^2me-(lp/h)^2)$. Here $H^{(2)}_n$ is a Hankel function of the second kind, nth order, and $B_{ln}$ is the constant weighting factor of the associated (l,n) mode. Here, the Hankel function describes the attenuation in relation to the distance r to the first via. m and e stand for the permeability and permittivity of the propagation medium, in the case of a PCB, $m≈m_0$ and $e≈3.8\square_0$. $w=2p$ f stands for the angular frequency, h for the thickness of the PCB, and/and n indicate the order of the mode. In the case of a two-layer PCB, h also corresponds to the length of the vias. Not all modes can be propagated. In addition, the cutoff frequency, which can be determined by setting $k_{r1}$ to zero, must be taken into account, above which the signal attenuation becomes too strong. Using these relationships and Maxwell's equations in conjunction with the resistivity of copper, it is possible to space the vias apart and dimension the length of the vias so that the current induced in the second via is of the order of the photocurrent. Thus, the distance can preferably be 10 µm to 10 mm, in particular 100 µm to 5 mm.

Advantageously, the photodetector or the receiver is a photodiode, an avalanche photodiode or a photomultiplier. The photodiode is preferred in applications with particularly large numbers of photons emitted by the sample. However, in the presence of a higher quencher concentration, the use of avalanche photodiodes may be required to meaningfully quantify the number of photons emitted. The use of avalanche photodiodes and simple photodiodes is particularly useful for those solutions that are intended to take full advantage of the miniaturization potential of the device. For example, silicon-based photodiodes can be used for visible light and near-infrared light. Otherwise, III-V semiconductor materials whose composition is adapted for the particular application can be used, for example AlGaN for UV light or InSb for IR light. However, if single photons are to be reliably detected, the use of a photomultiplier is a good solution.

BRIEF DESCRIPTION OF THE DRAWINGS

Further advantages, special features and expedient further embodiments of the invention are apparent from the dependent claims and the following illustration of preferred embodiments based on the figures.

From the illustrations shows.

DETAILED DESCRIPTION OF EXAMPLE EMBODIMENTS

Figure 1:
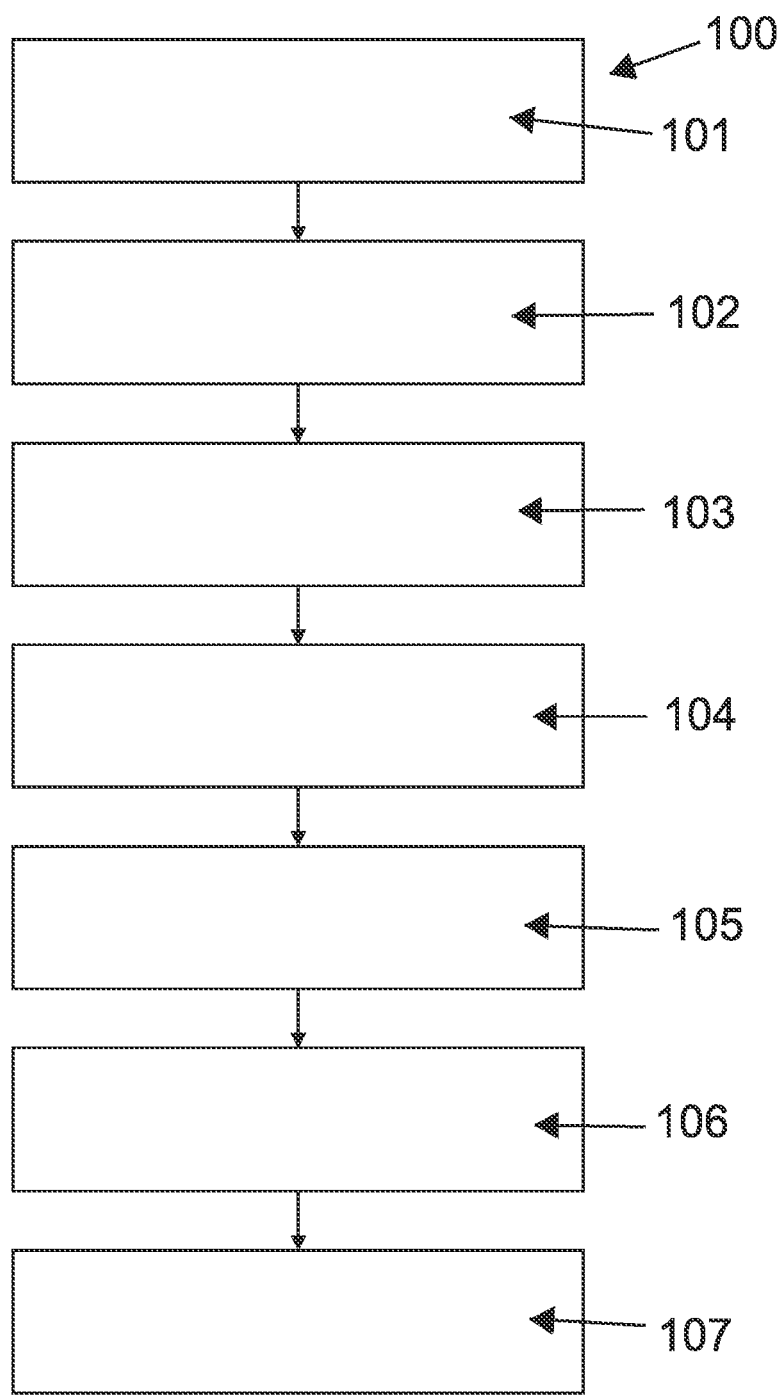
FIG. 1 is a process diagram of the essential method steps of an embodiment of the method according to the invention.
Figure 2:
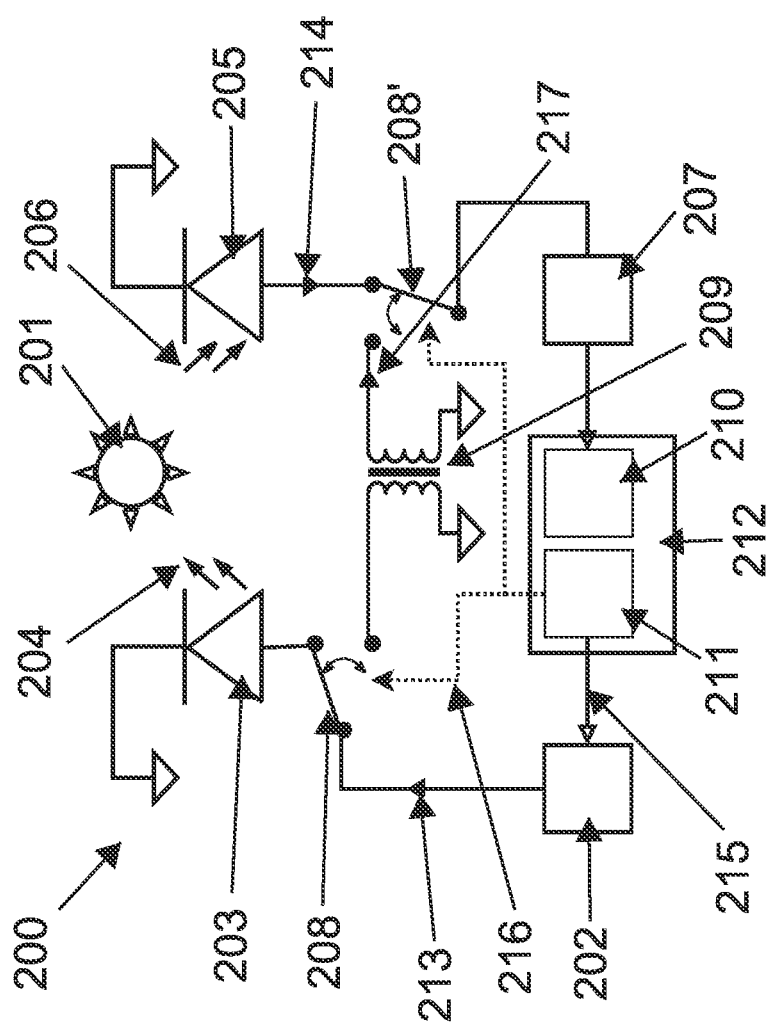
FIG. 2 is a schematic diagram of the circuit of one embodiment of the apparatus according to the invention.

A flow chart 100 in FIG. 1 shows the essential method steps of an embodiment of the method according to the invention for determining the luminescence of a sample 201, as can be carried out, for example, with the apparatus 200 shown in FIG. 2. The apparatus 200 comprises a sample 201, a mA current source 202, a light source 203, a photodetector 205, a transimpedance amplifier 207, a switch 208, a means 209 for electrically generating a reference signal, an evaluation unit 210 and a control unit 211.

In a first step 101, the light source 203, which is, for example, an LED or a LASER diode, is excited by means of an excitation current 213 and emits light of a first wavelength 204. The magnitude of the excitation current 213 of the mA current source 202 is thereby sinusoidally varied with frequency f between a minimum magnitude and a maximum magnitude. The frequency and amplitude of the excitation current 213 may be varied, for example, by a pulse width modulated excitation voltage 215.

In the next step 102, photons of a first energy, or light of a first wavelength 204, emitted by the light source 203 hit and excite the sample 201. For example, the wavelength here is 620 nm. The number of photons or the intensity of the light 204 thereby also varies sinusoidally with the frequency f due to the sinusoidal excitation current 213. In subsequent deactivation processes of the sample 201, radiative and non-radiative deactivation processes now occur, whereby the frequency of these non-radiative deactivation processes decreases with increasing concentration of quenchers present in the sample 201, such as molecular oxygen ($O_2$). During the radiative deactivation processes, photons of a second energy or light of a second wavelength 206 are emitted from the sample 201.

In the next step 103, the light 206 emitted by the sample 201 is measured in a receiver 205 and a first electrical signal 214 is generated and amplified as a function of the light 206 emitted by the sample 201. Due to the sinusoidal change in intensity of the light 206, the electrical signal 214 also has a sinusoidal dependence on the frequency f. The receiver 205 is formed here by a photodiode, so that the first electrical signal 214 is a photocurrent. The photocurrent can be amplified by means of a transimpedance amplifier 207.

In the next step 104, the phase difference $dF_1$ between the excitation current 213 and the amplified first electrical signal 214 is detected. The evaluation unit 210 and control unit 211 are located here in a common micro-controller 212. The value of the phase shift $dF_1$ can be stored in a register of the micro-controller 212 in a simple manner. However, it is equally possible to accommodate the evaluation unit 210 and control unit 211 in two different components. This can have advantageous effects on the noise behavior of the measuring part (consisting of receiver 205, amplifier 207, means 209 for generating the reference signal and evaluation unit 210) of the device 200. The evaluation unit 210 can transmit the value of the phase difference to the control unit 211 via a two-wire interface, for example, or store it in its own register.

During the next step 105, a second electrical signal is generated by the means 209 for electrically generating the reference signal from the excitation current 213 of the mA current source 202, so that the second electrical signal also changes with the frequency f. Meanwhile, the sample 201 is not irradiated. To perform this step 105, the control unit 211 first sets the control voltage 215 to zero, for example, so that the mA current source 202 does not supply a current 213. Subsequently, by means of a further control voltage 216, the control unit 211 triggers and holds the at least one switch 208, 208' in its second switch position, in which the mA current source 202 is now no longer connected to the light source 203, but to the means 209 for electrically generating the reference signal. In FIG. 2, for example, the second switch 208' can also be replaced by shorting the three terminals without greatly affecting the operation of the circuit. Here, the use of the second switch 208' increases the SNR. Next, the control unit 211 activates the control voltage 215 to control the mA current source 202 in the same way as before, so that the current 213 flows through/into the means 209 for electrically generating the reference signal. Here, the means 209 operates inductively and is formed by two suitably spaced vias so that the excitation current 213 flowing through the first via induces a reference current 217, which serves as the second electrical signal, in the second via (to illustrate the inductive coupling, in FIG. 2 the vias are represented by the symbol of a transformer). The reference current 217 also changes in amplitude with frequency f and is amplified by the transimpedance amplifier 207. The spacing of the vias here is 250 µm.

In the next step 106, the phase difference $dF_2$ between the excitation current 213 and the amplified second electrical signal, i.e. the amplified reference current 217, is detected in the evaluation unit 210 and stored in a further register different from the first one but located in the same component. The component is the micro-controller 212, if the evaluation unit 210 and the control unit 211 are installed in a common micro-controller 212, or alternatively the evaluation unit 210 or the control unit 211, if they are separate from each other.

Subsequently, in the next step 107, the decay time of the luminescence of the sample 201 is determined based on a phase difference dF between the excitation current 213 and the light emission of the sample 201. Here, the phase difference dF is determined from the difference between the first phase difference $dF_1$ and the second phase difference $dF_1$ of the amplified electrical signals. This step 107 is performed, for example, in the micro-controller 212 by subtraction via $dF=dF_1-dF_2$. Based on the value of the phase shift dF of the sample 201, the decay time of the luminescence can then be inferred and, for example, a concentration of a quencher can be determined with high accuracy using comparison data.

The embodiments shown here are only examples of the present invention and must therefore not be understood as limiting. Alternative embodiments contemplated by the skilled person are equally encompassed by the scope of protection of the present invention.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

LIST OF REFERENCE SIGNS

100 Flow chart
101 Step 1
102 Step 2
103 Step 3
104 Step 4
105 Step 5
106 Step 6
107 Step 7
200 Apparatus
201 Sample
202 Current source
203 Light source
204 Light of first wavelength
205 Photodetector
206 Light of second wavelength
207 Transimpedance amplifier
208 First switch
208' Second switch
209 Means for electrical generation
210 Evaluation unit
211 Control unit
212 Micro-Controller
213 Excitation current
214 Photocurrent
215 Control voltage
216 Control voltage
217 Reference current

The invention claimed is:

1. A method for determining a decay time of a luminescence of a sample, comprising the following steps:
   exciting a light source by means of an excitation current of a current source, wherein the magnitude of the excitation current of the current source is periodically changed with frequency f between a minimum magnitude and a maximum magnitude;
   irradiating the sample with a light of a wavelength suitable for exciting luminescence in the sample, wherein the irradiation intensity is varied periodically with frequency f over several periods;
   measuring a light emitted from the sample in a receiver, generating a first electrical signal as a function of the light emitted from the sample, and amplifying the first electrical signal, wherein the light emitted from the sample varies in intensity periodically with frequency f such that the first electrical signal varies as a function of frequency f;
   detecting a first phase difference $dF_1$ between the excitation current and the amplified first electrical signal;
   generating a second electrical signal with frequency f for determining the additional phase shift caused by the measurement and amplification, wherein the second electrical signal is generated directly from the excitation current of the current source without an interposition of a light source and is subsequently amplified, wherein the sample is not irradiated during this time;
   detecting a second phase difference $dF_2$ between the excitation current and the amplified second electrical signal; and
   determining the decay time of the luminescence of the sample based on a phase difference dF between the excitation current and the light emission of the sample, wherein the phase difference dF is determined from the difference of the first and second phase differences of the amplified electrical signals: $dF=dF_1-dF_2$.

2. The method according to claim 1, wherein the excitation current is varied sinusoidally with frequency f between the minimum amount and maximum amount so that the irradiation intensity is varied sinusoidally with frequency f and the intensity of the light emitted from the sample varies approximately sinusoidally with frequency f.

3. The method according to claim 1, wherein the second electrical signal is generated from the excitation current via inductive coupling, wherein the second electrical signal is an nA current signal.

4. The method according to claim 3, wherein the inductive coupling is realized by a transformer or two conductor track sections running parallel to each other at a well-defined small distance.

5. The method according to claim 3, wherein the inductive coupling is realized by exploiting a parasitic inductance of a first via, wherein the excitation current through the first via builds up a magnetic field around the first via, a second via being arranged at a defined distance from the first via, so that in the second via, due to a change in the magnetic field of the first via, the second electrical signal is induced as a current signal according to Lenz's rule in the second via.

6. An apparatus for determining a decay time of a luminescence of a sample, comprising: a sample, a mA current source, a light source comprising a semiconductor material having a first bandgap suitable for generating a light of a wavelength sufficient to excite luminescence in the sample, a photodetector suitable for measuring a light emitted from the sample due to the luminescence, a transimpedance amplifier, a switch, a means for electrically generating a reference signal, an evaluation unit, and a control unit.

7. The apparatus according to claim 6, wherein the light source is an LED or a LASER diode.

8. The apparatus according to claim 6, wherein the means for electrical generation comprises a transformer, the primary side being connected to the mA current source in a switch position controllable by the control unit and the secondary side being electrically connected to the input of the transimpedance amplifier, wherein a number of turns ratio of the transformer is selected such that an amplitude of the current flowing on the secondary side is not greater than 10 times an amplitude of a current generated by the photodetector.

9. The apparatus according to claim 6, wherein the means for electrical generation comprises two vias arranged at a defined distance from each other, wherein the first via is connected to the mA current source in a switch position controllable by the control unit and wherein the second via is electrically connected to the input of the transimpedance amplifier, wherein the length of the vias and the spacing of the vias from each other are selected such that an amplitude of the current flowing in the second via is no greater than 10 times an amplitude of a current generated by the photodetector.

10. The apparatus according to claim 6, wherein the photodetector is a photodiode, avalanche photodiode, or photomultiplier.

\* \* \* \* \*